(12) United States Patent
Mani et al.

(10) Patent No.: US 7,275,026 B2
(45) Date of Patent: Sep. 25, 2007

(54) IMPLICIT FRAME-BASED PROCESSING FOR BLOCK-DIAGRAM SIMULATION

(75) Inventors: Ramamurthy Mani, Newton, MA (US); Don Orofino, Sudbury, MA (US)

(73) Assignee: The Mathworks, Inc., Natick, MA (US)

( * ) Notice: Subject to any disclaimer, the term of this patent is extended or adjusted under 35 U.S.C. 154(b) by 1162 days.

(21) Appl. No.: 09/908,096

(22) Filed: Jul. 18, 2001

(65) Prior Publication Data

US 2003/0016234 A1 Jan. 23, 2003

(51) Int. Cl.
G06F 17/50 (2006.01)
G06F 3/00 (2006.01)
G06F 3/048 (2006.01)
G06G 5/00 (2006.01)
G06F 9/44 (2006.01)

(52) U.S. Cl. .................. 703/13; 717/104; 715/762; 715/782; 345/621

(58) Field of Classification Search .................. 703/13; 345/621, 619, 423; 725/44; 715/782, 967, 715/763, 762; 717/104
See application file for complete search history.

(56) References Cited

U.S. PATENT DOCUMENTS

| | | | | |
|---|---|---|---|---|
| 5,301,301 A * | 4/1994 | Kodosky et al. ............. 716/11 |
| 5,481,740 A * | 1/1996 | Kodosky ................... 715/839 |
| 5,490,246 A * | 2/1996 | Brotsky et al. ............. 715/763 |
| 5,572,657 A * | 11/1996 | Pinedo et al. ............... 345/562 |
| 5,630,042 A * | 5/1997 | McIntosh et al. .......... 715/744 |
| 5,805,171 A * | 9/1998 | St. Clair et al. ............ 345/619 |
| 5,933,637 A * | 8/1999 | Hurley et al. ............... 717/107 |
| 6,128,589 A * | 10/2000 | Lilly .......................... 703/13 |
| 6,182,278 B1 * | 1/2001 | Hamada et al. ............. 717/107 |
| 6,278,456 B1 * | 8/2001 | Wang et al. ................. 715/700 |
| 6,421,694 B1 * | 7/2002 | Nawaz et al. ............... 715/526 |
| 6,701,513 B1 * | 3/2004 | Bailey ........................ 717/109 |
| 6,937,969 B1 * | 8/2005 | Vandersteen et al. ......... 703/14 |
| 6,993,773 B2 * | 1/2006 | Broussard ................... 719/328 |
| 7,047,495 B1 * | 5/2006 | Pang .......................... 715/736 |

OTHER PUBLICATIONS

DSP Blockset 2 Version Compatitabiltiy Mathworks 1997 p. 1-3.*
Mascarin et al., "Frame-baseed Processing with DSP Blockset" MATLAB Digest p. 1-4 p. 1999.*
Paredis et al., "Composite Models for Simulation-based Design" Apr. 21, 2000 p. 1-14.*
Vaupel-J. "Implicit and Explicit Services and their implementation through an Active Services Architecture" 1999 p. 417-427 INt ComputSci Inst, Berkeley, CA.*
Demirkiran et al., "A Knowledge-Based Interference Rejection Scheme for Direct Sequence Spread-Spectrum System" 1997. p. 120-124.*
Demirkiran et al., "Knowledge-Based Approach to Interfernece Rejection for EMC" 1998. p. 1150-1155.*
Mani et al., "Integrated Numeric and Symbolic Signal Processing using a Heterogeneous Design Environment" 1996 p. 445-456.*
Matlab News and Notes. Feb. 2000. p. 1-18.*

* cited by examiner

Primary Examiner—Anthony Knight
Assistant Examiner—Thomas Stevens
(74) Attorney, Agent, or Firm—Lahive & Cockfield, LLP

(57) ABSTRACT

A run-time, frame-based processing mechanism executes a block diagram model by propagating frame attributes information from blocks on which a user specified the frame attributes information to all other blocks in the block diagram model. The frame attributes information includes an indicator that specifies whether or not the data flowing from one block to another is sample-based or frame-based, as well as the size of the frame in terms of number of samples and number of channels.

20 Claims, 8 Drawing Sheets

IMPLICIT FRAME-BASED PROCESSING FOR BLOCK-DIAGRAM SIMULATION

BACKGROUND

The invention relates generally to graphical block diagram modeling.

Signal processing systems generally consist of a cascade of components that perform a series of signal operations and transformations to one or more input signals in order to obtain a set of desired output signals. In most real world applications, such systems are required to carry out the processing in real time to produce samples of the output signals as samples of the input signals become available. This processing may be carried out using one of the following two approaches: sample-based processing and frame-based processing. With a sample-based processing approach, each component consumes at most one sample of its input signal every time it executes. With a frame-based processing approach, each component consumes a batch or "frame" of contiguous samples of its input signal every time it executes.

Frame-based processing has two major advantages over sample-based processing. It decreases the number of times components need to communicate with each other in order to process a given number of samples. This reduction in communication decreases the messaging overhead between components both in software and hardware implementations of the overall system. Another scenario where frame-based processing reduces messaging overhead may be understood by considering a DSP system that is implemented as a cascade of a variety of components including an A/D converter. In many scenarios, the A/D converter is serviced by an interrupt service routine (ISR). Each call to the ISR has a fixed performance overhead regardless of the number of samples obtained from the A/D at each interrupt. Therefore, it is beneficial to reduce the number of times the ISR is executed by bundling up frames of samples during each call to the ISR.

There are also a variety of signal operations and transformations that have more efficient algorithmic implementations when more than one sample is processed at each execution step of the algorithm. An example of such an operation is Finite Impulse Response (FIR) digital filtering, which may be implemented either through a direct sample-based convolution or through the frame-based Overlap-Add (OLA) Algorithm.

Graphical block-diagram based tools attempt to simplify the process of conceptualizing, designing, simulating, and finally implementing (in hardware) custom signal processing systems. In a graphical context, a block diagram is a representation of a real-world system through a graph containing nodes (referred to as "blocks") interconnected by arcs (referred to as "lines"). Blocks are functional entities that perform mathematical operations and transformations on the data being processed by a system. The lines represent streams of data (called "signals") flowing between the various blocks.

Specialized signal processing hardware such as A/D converters, D/A converters, and signal processors also offer inherent support for frame-based processing, thus making it important for block diagram tools which allow users to map their systems from concept to hardware implementation to provide such frame-based processing support.

Prior graphical block diagram modeling tools offer some measure of frame-based processing support. Such support, which suffers from some limiting restrictions, falls into one of two categories. One category of products employ a global frame-processing mechanism. That is, users have the option to specify whether or not the blocks in the block diagram are operating in frame-based or sample-based mode. When operating in frame-based mode, users have the ability to specify the number of samples in each frame of data. Thus, there is the ability to toggle frame-processing for the entire block-diagram. The Hypersignal package from Hyperception is an example of a product that falls into this category. One drawback to using a global frame-processing setting, however, is that users cannot build heterogeneous systems that either (i) mix frame- and sample-based sub-components, or (ii) mix several sub-components with different frame sizes.

A second category of frame-based processing support provides users with the ability to toggle frame-processing for each block. That is, users have the ability to specify whether or not each block is operating in frame-based mode. In addition, users can specify the size of the frame at each block. This type of scheme was implemented in Version 2.0 of the DSP Blockset for Simulink®, available from The MathWorks, Inc. While the latter block-specific toggling approach allows users to build heterogeneous systems (systems that have sub-components with both frame- and sample-based characteristics), it is fairly cumbersome and error-prone because the user is forced to enter redundant frame information at each primitive.

SUMMARY

In one aspect, the invention provides methods and apparatus, including computer program products, for processing a graphical block diagram model. The methods include receiving a graphical block diagram of blocks for a model developed by a user, receiving frame attributes information specified by the user for at least one block in the graphical block diagram model and using the frame attributes information specified by the user to produce unspecified frame attributes information for other blocks in the graphical block diagram model.

Particular implementations of the invention may provide one or more of the following advantages.

The frame-based processing mechanism enables propagation of a frame attribute so that users need only specify frame information at a few locations (source blocks, buffer-type blocks and blocks which perform sample rate conversion) in their block diagrams. It also introduces the concept of "block polymorphism", which helps blocks adapt their behavior to be sample- or frame-based behavior at run-time. Furthermore, the frame-based processing mechanism allows extensions to support multi-channel frame-based processing and supports a GUI representation that enables users to visually partition the various sub-components of their system on the basis of the sub-component's frame and channel properties.

Other features and advantages of the invention will be apparent from the following detailed description and from the claims.

DETAILED DESCRIPTION

Figure 1:
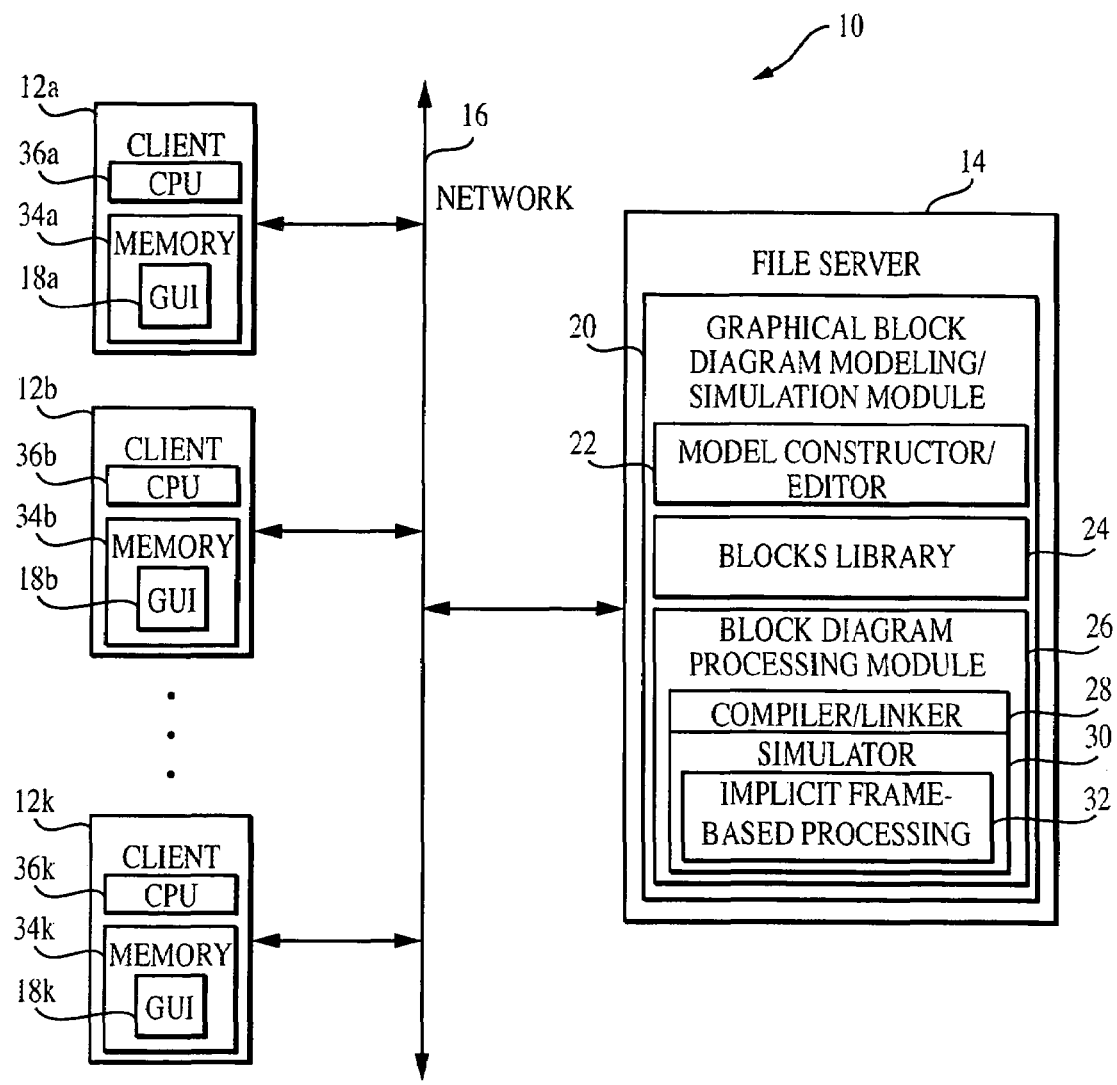
FIG. 1 is a block diagram of a system that includes a file server that stores a graphical block diagram modeling/simulation module that includes a model editor and simulator that supports implicit frame-based block diagram processing and client systems that access a file server and execute processes of the graphical block diagram modeling/ simulation module for graphical block diagram model development and execution.

Referring to FIG. 1, a system 10 includes client systems 12a, 12b, . . . , 12k and a file server 14 each connected to a network 16, e.g., an Ethernet network, the Internet, or other type of network. Alternatively, instead of being connected to a network, the systems 12 and 14 could be interconnected by a system bus such as Fibre Channel. Each of the client systems 12a, 12b, . . . , 12k includes a graphical user interface (GUI) 18a, 18b, . . . , 18k. The file server 14 is configured with a graphical block diagram modeling and simulation module 20 (hereinafter, simply, "the module"), which is implemented in software. The module 20 includes a model constructor/editor 22, as will be described later. The module further includes a blocks library 24 and a block diagram processing engine 26. As will be explained more fully below, the model editor 22, in conjunction with the library 24, is used by a client system user to construct and display a graphical block diagram model which visually and pictorially represents a dynamic system of interest to that user. The block diagram processing engine 26 includes a compiler/linker 28 to compile the block diagram created using the model editor 22 and a simulator 30 that executes the compiled version of the block diagram to produce simulation results. The simulator 30 includes an implicit frame-based block diagram processing process 32, as will be described. Although not shown, the module 20 could also include a code generator for converting block diagrams to executable code.

The system 10 illustrates a remote client access configuration in which the module 20 is installed on a central file server, i.e., the file server 14, and users of the client system 12 access the module 20 over the network 12. In an alternative configuration, eg., in an environment in which access to the library 24 is not shared by multiple users, the module 20 could be installed on a single stand-alone 32 or networked computer system for local user access.

Each of the client systems 12a, 12b, . . . , 12k, includes a respective memory 34a, 34b, . . . , 34k, for storing all or accessed portions of the module 20, as well as a respective CPU 36a, 36b, . . . , 36k for executing the stored portions of the module 20, the GUI 18 and other OS programs (not shown) for controlling system hardware. Although not shown, it will be understood that the systems 12 and 14 can be, in other respects, of a conventional design and architecture. That is, the systems 12 include conventional system I/O peripherals, e.g., display, mouse, keyboard and the like, for enabling user interaction with the system. The file server 14 includes conventional server software and hardware, and thus includes the appropriate storage for storing the software programs of the module 20, along with OS and server application programs, and CPU for executing those programs.

For illustrative purposes, the module 20 will be described within the context of a Simulink® and MATLAB® based simulation environment. Simulink® and MATLAB® are commercial software products available from The MathWorks, Inc. The Simulink® software package includes a number of different tools, such as special user interfaces and navigational tools, e.g., a library browser, which will be referenced in the description to follow. Further details of these tools and interfaces can be had with reference to available Simulink® and MATLAB® product documentation. It will be understood, however, that other block diagram based modeling software platforms could be used.

The term "graphical block diagram" refers to a set of graphical blocks (or nodes) and a set of lines (or signals) that carry data between the graphical blocks. Each graphical block typically performs a function and that function (or equation) is a sub-component of an overall set of equations describing a dynamic system. The function may be mathematical in nature or it may be an operation such as reading data from a hardware device. The graphical blocks may be parameterized with user-defined or default values, as will be described.

Thus, a graphical block diagram is a form of graphical programming for functional and object-oriented development methodologies. Each graphical block implements a set of equations that define how the block operates. Using the functions or equations defined by each of the blocks, the graphical block diagrams can be executed in an interpreted environment to produce simulation results as defined by the graphical blocks and signals in a model. Each of the equations is defined in a corresponding method (code module). For example, an output method, when invoked by the simulator 30 during model execution, determines an output signal based on a given input signal and block parameter values. To support the implicit frame-based processing, the module 20 maintains for each block two output methods, one sample-based and one frame-based, which are selected at run-time based on propagated input signal information, as will be described below.

The module 20 enables users to copy graphical blocks into their models from the libraries 24 (or, optionally, from external libraries). Alternatively, or in addition, the module 20 allows a user to implement a custom block for use in a model and to add that custom block to the library 24 if the user so chooses. The Simulink® product calls such custom blocks "S-function blocks".

Figure 2A:
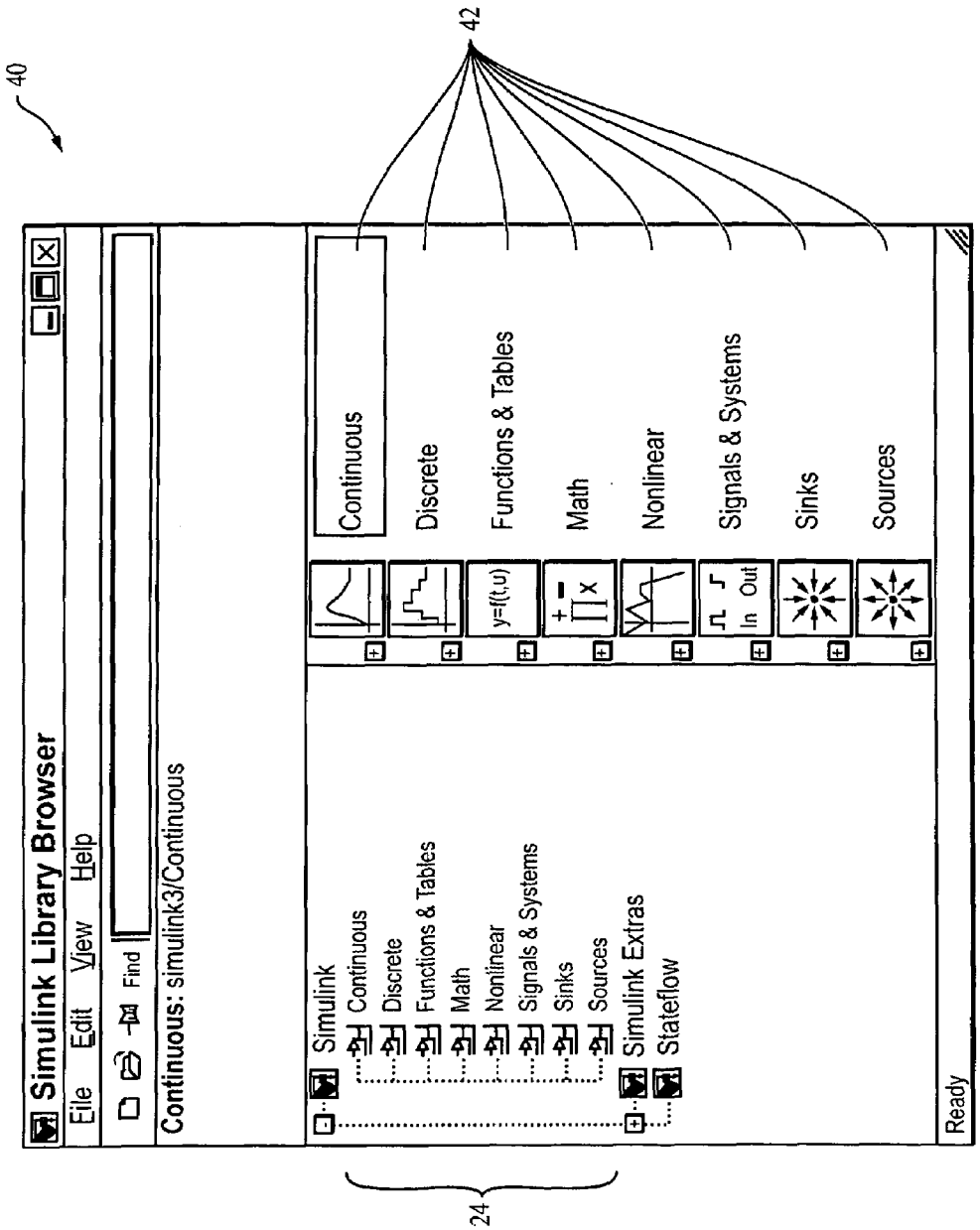
FIGS. 2A-B are depictions of an exemplary library of graphical blocks libraries provided by the graphical block diagram modeling/simulation module (of FIG. 1) and available for use in developing and executing a graphical block diagram model.
Figure 2B:
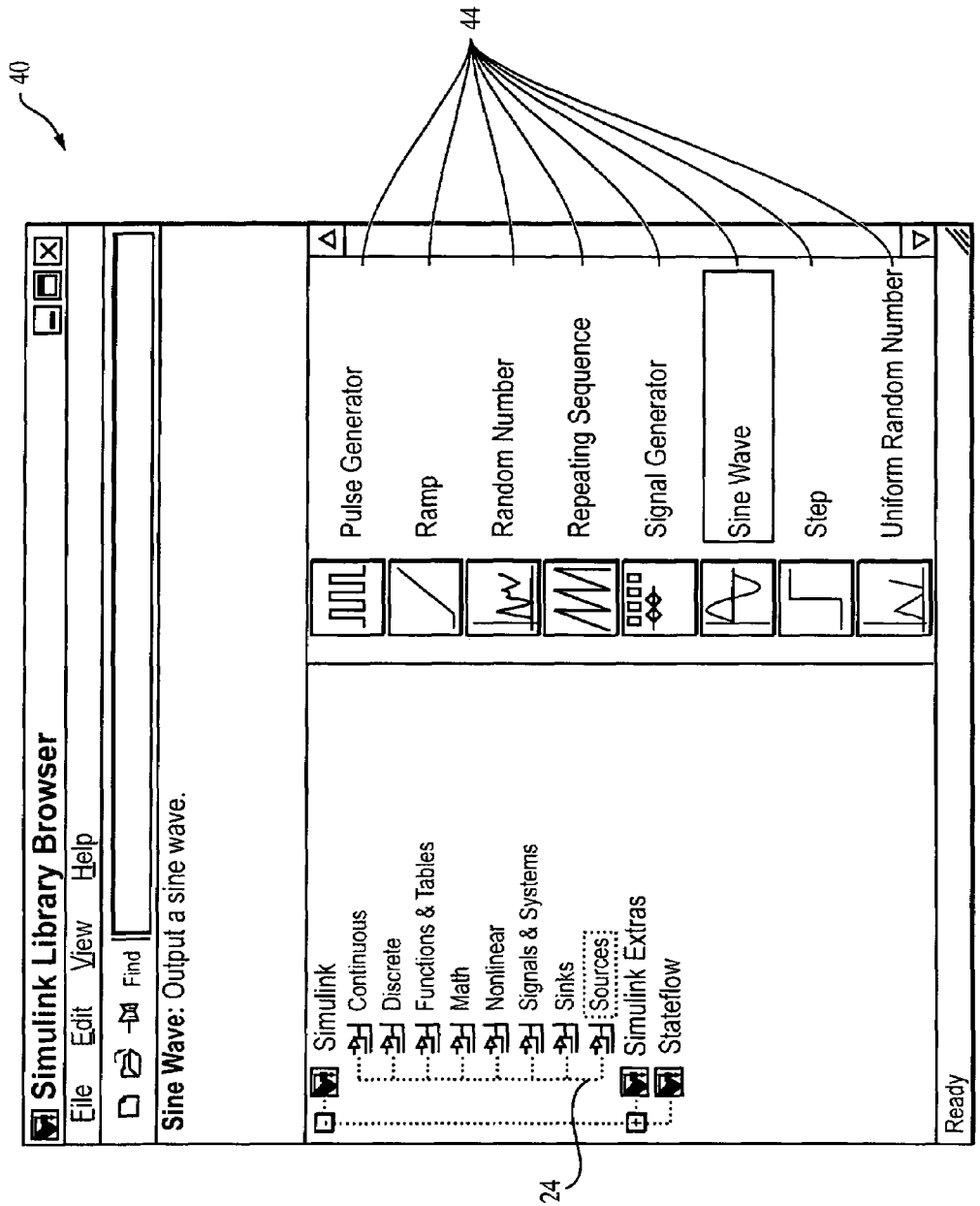

FIGS. 2A-2B provide screen shot depictions of an exemplary embodiment of the library 24 as a Simulink® library as presented in a window of a Simulink® library browser 40. As shown in FIG. 2A, the library 24 is a collection of libraries 42 each corresponding to different groupings or categories of blocks. It will be appreciated that the libraries are represented within the context of the library browser's tree structure as nodes or icons. As shown in FIG. 2B, each library 42 includes a set of one or more blocks 44. The blocks 44 in the library 24 can include both the most basic building blocks or elements, as well as the more complex graphical subsystem blocks made up of interconnected graphical blocks (or sub-blocks). In the particular example shown in FIG. 2B, a user has selected a "sources" library, which includes among the members of its set of graphical source blocks the graphical blocks "pulse generator", "ramp", "random number", "repeating sequence", "signal generator", "sine wave", "step" and "uniform random number". These blocks all represent signal generator functionality and are therefore grouped together in the sources library. The "subsystem" blocks, for example, the "repeating sequence" graphical block, each have a detailed implementation (not shown) of the function to which it corresponds. Thus, a user operating one of the client systems 12 uses the blocks 44, for example, the sine wave block, to build a graphical block diagram using the model editor 22.

The library (of block libraries) 24 is similar to a system software library in that it is a repository of classes. When a graphical class is used in a model, it is said to be instantiated, i.e., an instance of the graphical class is created for use in the model. Such an instance is a link to the graphical class that resides in the library. Parameters are class members that are specified when a user constructs a new instance of a class. Instances associated with the class have parameter specification interfaces that allow users to define these top-level parameters. On a GUI, such parameter specification interfaces take the form of a dialog box with various parameter fields.

To implement sample or frame-based processing for blocks in a model, the process 26 requires only that the user specify necessary frame attribute information for two types (or categories) of blocks. More particularly, in the described embodiment, the model constructor/editor 22 allows users to specify frame attribute information in only one of three categories of blocks, source blocks, buffer-type blocks and blocks which perform sample rate conversions. As indicated earlier, source blocks are blocks that generate a signal. Users can specify how many samples a source block should add to a buffer to create a frame of data. Once the buffer is full, the source outputs one frame of data. Blocks with buffering generate a frame-based signal from a sample-based signal by storing samples in a buffer corresponding to a frame of data. For each source or block with buffering used in a model, the user specifies in a parameter field for that block's dialog box a frame size, that is, a number of samples per frame. A default value of one would correspond to a sample-based setting. The process 26 uses the specified frame attribute information to determine frame attribute information for the other blocks. Thus, process 26 provides for greater ease-of-use than prior techniques that required that such frame attributes information be specified by the user via a dialog box on a block-by-block basis during model generation.

Figure 3:
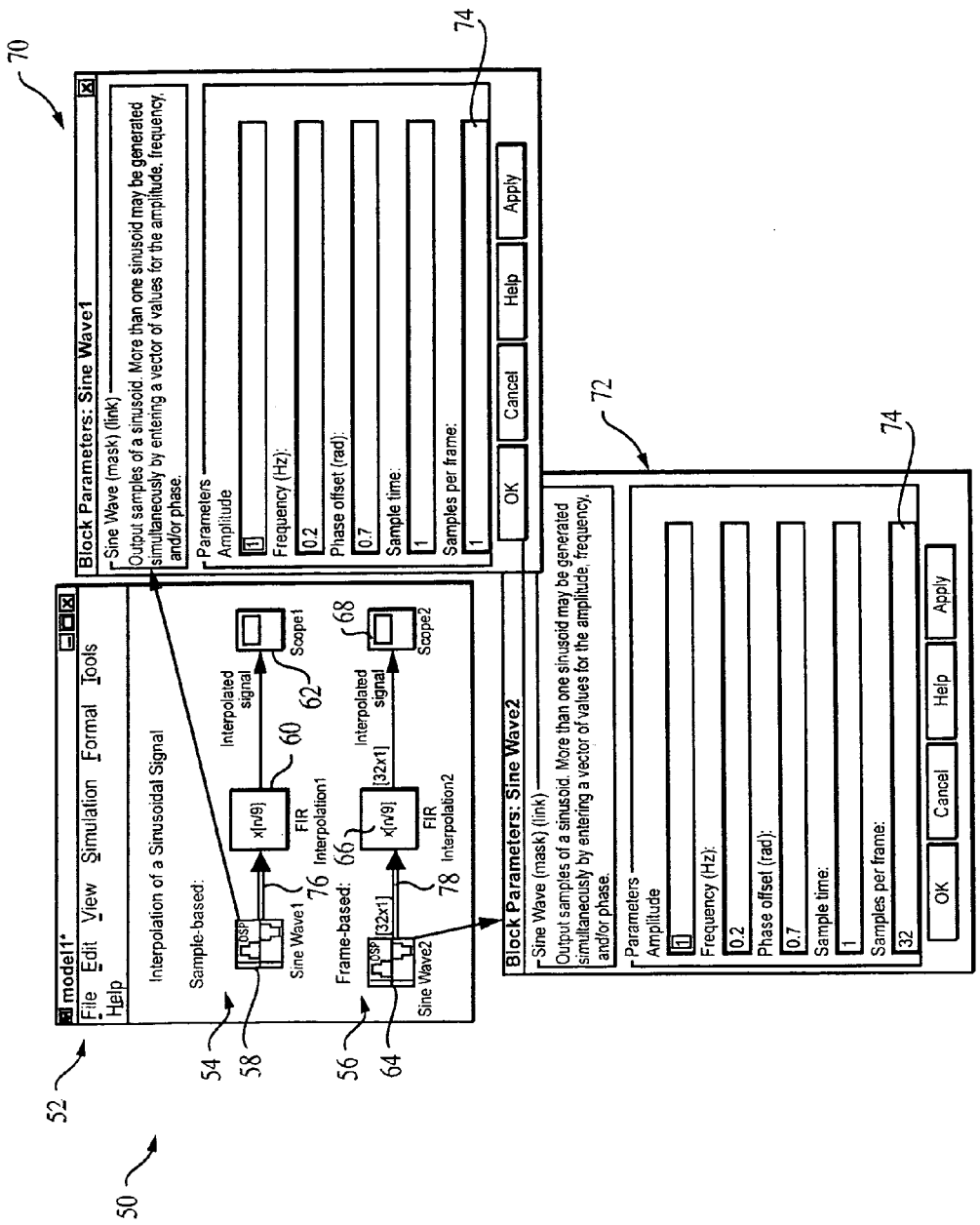
FIG. 3 is a set of exemplary screen displays from a GUI of a client system executing the model editor of the graphical block diagram modeling/simulation module (of FIG. 1) during graphical block diagram model development, illustrating sample-based and frame-based model implementations.

FIG. 3 illustrates hierarchical user interface screen shots of an illustrative FIR interpolation block diagram 50 that includes, and as is shown in a top-level model window 52, a sample-based implementation 54 and a frame-based implementation 56. The sample-based implementation 54 includes a Sine Wave1 block 58, an FIR Interpolation1 block 60 and a scope1 block 62. The frame-based implementation 56 includes a Sine Wave2 block 64, an FIR Interpolation2 block 66 and a scope2 block 68. In this example, the only block for which frame information must be specified is the source Sine Wave2 block 64. Block parameters dialog boxes 70, 72 for the sample-based implementation 54 and the frame-based interpolation implementation 56, respectively, are opened by clicking on respective icons for Sine Wave1 block 58 and Sine Wave2 block 64 (as indicated by the arrows from the icons for blocks 58, 64 to the dialog boxes 70, 72, respectively). Each of the block parameter dialog boxes 70, 72 includes a "samples per frame" field 74. In the sample-based interpolation implementation parameter dialog box 70, the "samples per frame" parameter field 74 is set to a default value of 1. In the frame-based interpolation implementation parameter dialog box 72, a rate of 32 samples per frame is specified in the "samples per frame" parameter field 74. This latter parameter setting implies that the block will produce frame-based data with 32 samples per frame of data.

At the time of execution of the block diagram (also referred to herein as 'run-time'), the simulator 30 first performs a block diagram model compilation. As part of that compilation, the simulator 30 uses the process 32 to determine unspecified frame attributes. Process 32 uses an attributes propagation mechanism to propagate the frame information specified by the user in the parameter dialog boxes of any source, buffer-type and/or rate-conversion blocks from those blocks to all other blocks in the block diagram downstream from those blocks. In the described embodiment, the frame information that is propagated is the specified frame attribute information, that is, an indicator that specifies whether or not the data flowing from one block to another is sample- or frame-based, as well as the size of the frame in number of samples (M). The frame size is represented as an [M×1] vector.

Referring again to the frame-based portion of the block diagram example shown in FIG. 3, the specified frame information is propagated automatically from the Sine Wave2 block 64 to the downstream blocks, that is, the FIR Interpolation2 block 66 and Scope2 block 68. Thus, any blocks for which the frame attributes are not specified automatically obtain frame attribute information through propagation.

For heterogeneous simulations (i.e., simulations involving sample-based and frame-based blocks), the module 20 supports a GUI representation that includes visual cues to assist the user in partitioning a block-diagram into sample- and frame-based sub-components. Such cues are necessary for users to be able to quickly assimilate the most information from looking at a graphical representation of the block diagram. The first visual cue involves drawing the wires connecting blocks in two different formats. The first type of visual cue is illustrated in FIG. 3. For wires that represent the flow of sample-based signals from one block to another, a single line 76 is used as a visual cue. For wires that represent the flow of frame-based signals from one block to another, a double line 78 is used as a visual cue. Thus, these visual cues, the single line 76 and the double line 78, serve to readily distinguish the sample-based implementation 54 from the frame-based implementation 56.

In a variety of signal processing domains, the signal data is segregated into multiple channels (e.g., two-channel stereo signals in the audio domain, N-channel signals in radar and sonar domain). Furthermore, in these domains the multi-channel data is processed as a single atomic signal through an application system (e.g. a compression system for audio signals). The process 32 allows for multi-channel, frame-based processing by extending the propagation mechanism described above. Multi-channel processing is achieved by extending this mechanism to carry an additional piece of information—the number of channels (N). To obtain conciseness of representation, the frame and channel size information is combined into the array representation [M×N].

Figure 4:
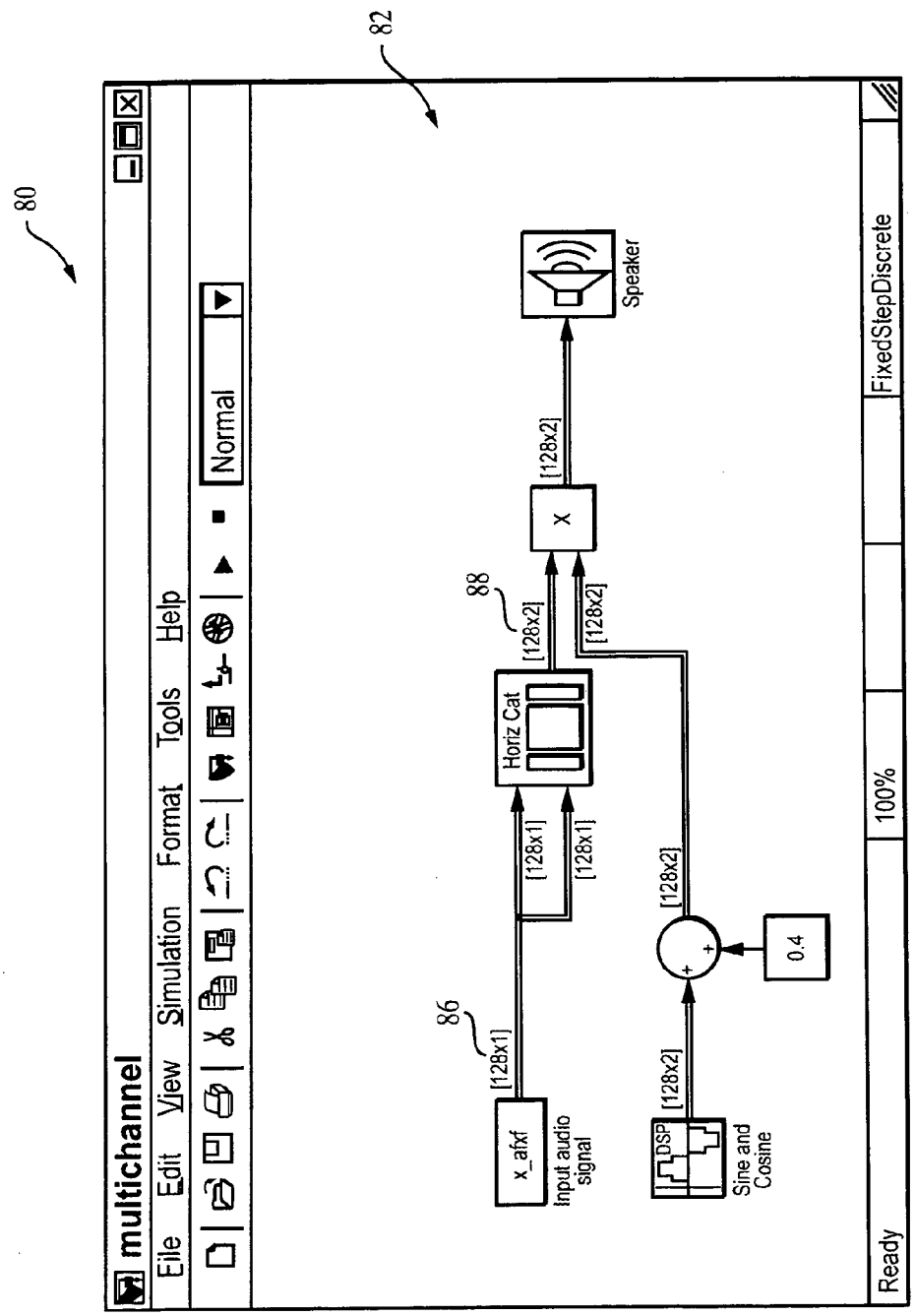
FIG. 4 is an exemplary screen display from a GUI of a client system executing the model editor of the graphical block diagram modeling/simulation module (of FIG. 1) during graphical block diagram model development and illustrating a multi-channel extension of implicit frame-based block diagram processing.

Referring to FIG. 4, a screen shot 80 of an exemplary block diagram generated with multi-channel frame-based processing 82 is shown. The block-diagram 82 simulates the audio special-effect of stereo panning. More particularly, one 128-sample frame of mono audio data is converted to stereo audio data with 128 samples per channel.

In addition to the visual cues discussed above, the module 20 shows the size of the frame (M) and the number of channels (N) of data on each wire in the format [M×N]. This type of visual cue is illustrated in FIG. 4. The block diagram 82 of FIG. 4 includes a single channel visual cue "[128×1]" 86 and a dual-channel visual cue "[128×2]" 88.

It will be understood that two different sets of users can use the block-diagram software. One set of users, referred to herein as secondary users, are responsible for implementing blocks that correspond to various signal-processing primitives. Another set of users, referred to herein as tertiary users, build only block-diagrams that implement their custom signal processing systems. Thus, the secondary users have the capability to package both sample- and frame-based implementations of a primitive in a single block. At run-time, the block uses the appropriate implementation (that is, selects the appropriate output method) once the frame attributes of all input signals are known. This dynamic choice of implementation at run-time is akin to the concept of polymorphism exhibited by programming languages such as C++ and Java. Tertiary users can use the same primitive in both sample- and frame-based contexts without specifying the exact context apriori. Such capability contributes to the ease-of-use of the software. Additionally, both secondary and tertiary users can also easily switch between sample- and frame-based implementations of their systems by manipulating only the source, buffer-type and rate-conversion blocks. In the example shown in FIG. 3, a user need only specify frame information at the source sine-wave blocks. The remaining primitives that are downstream from these sources automatically adapt to sample- or frame-based behaviors.

The manner in which the process 32 operates will be described with reference to FIGS. 5A-5C. The inputs to the process 32 include a block-diagram of blocks interconnected by lines, along with frame and channel information specified at source blocks, buffer-type blocks and rate-conversion blocks, as was described above. At the output, the process 32 produces frame and channel information available at the inputs and outputs to each of the blocks in the block diagram, as well as one or more representations of frame information on the GUI, that is, visual cues.

Figure 5A:
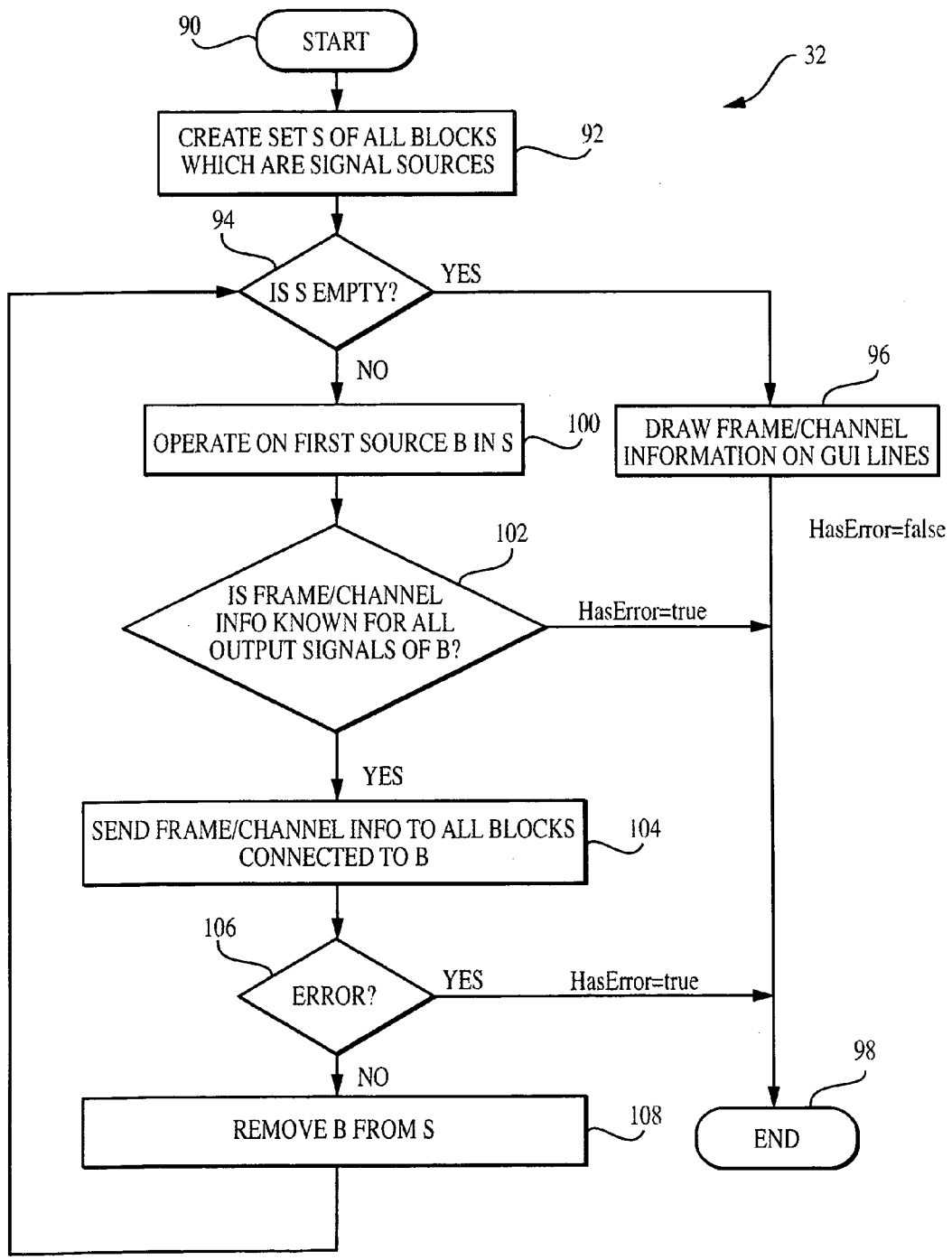
FIGS. 5A-5C are flow diagrams of the implicit frame-based block diagram processing supported by the graphical block diagram modeling/simulation software (of FIG. 1).
Figure 5B:
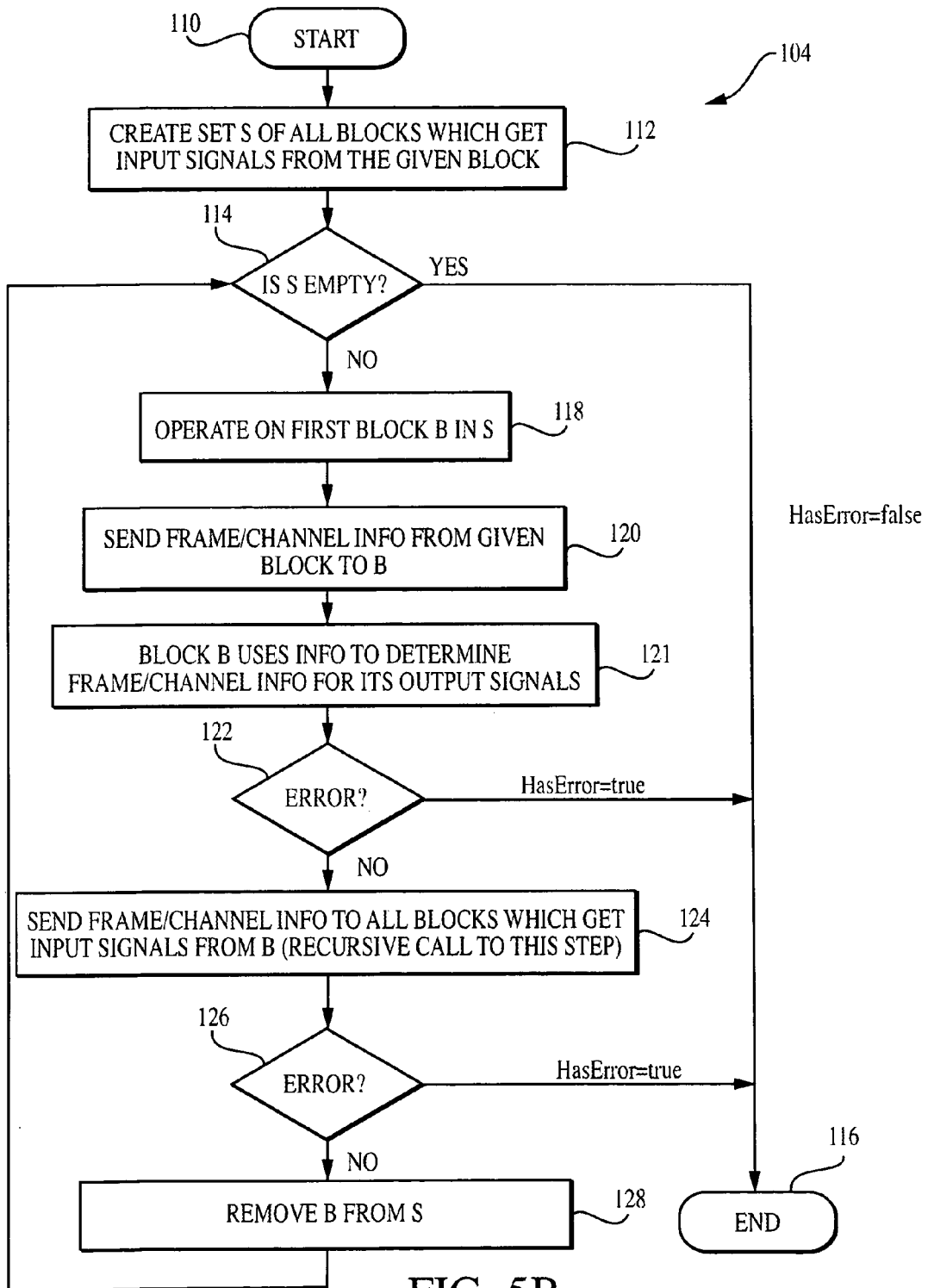
Figure 5C:
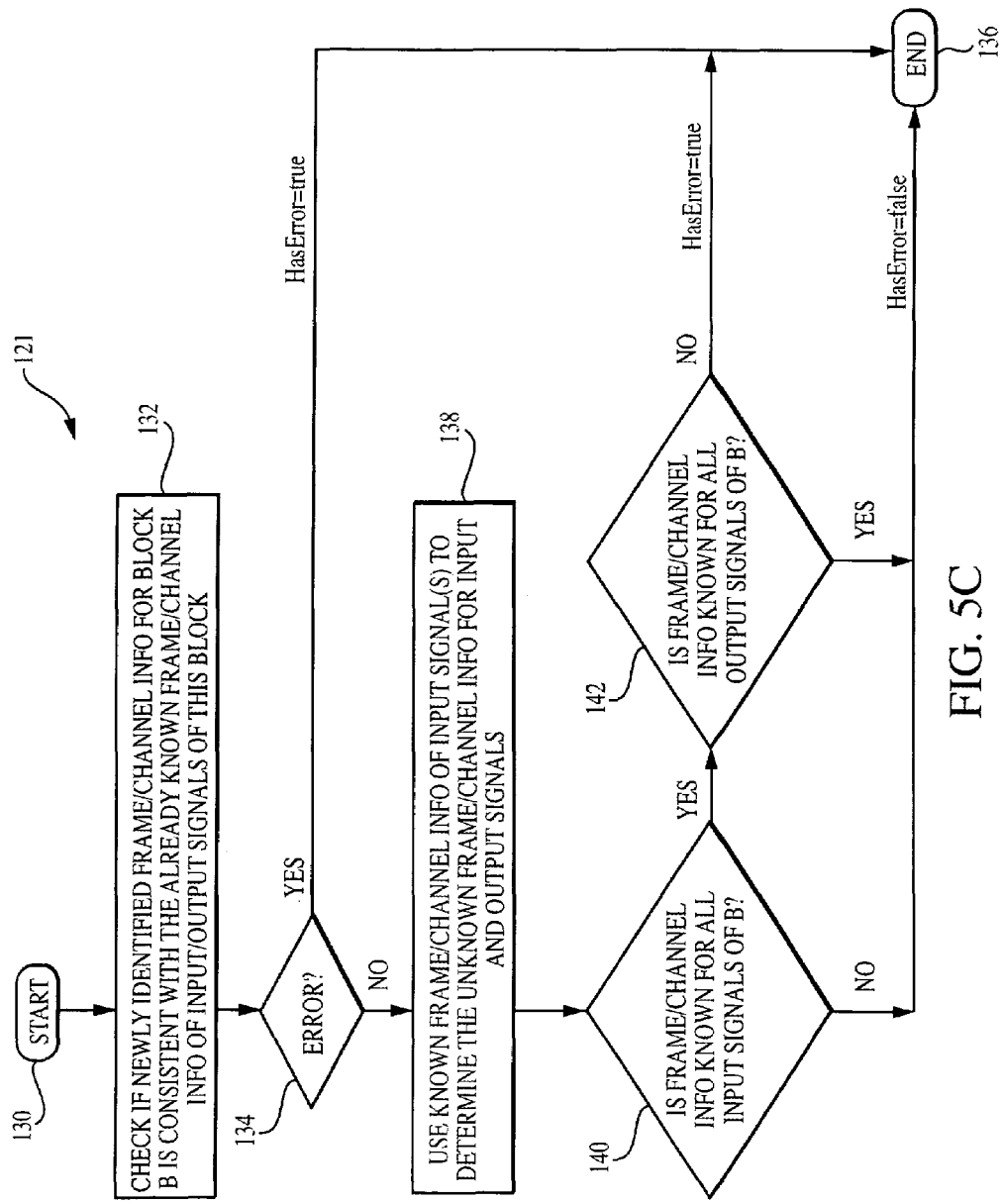

FIG. 5A illustrates an overall processing loop that is responsible for sending frame and channel information from source blocks (which have frame attributes parameters) to all blocks connected directly or indirectly to them. The process 32 begins (step 90) by creating a set "S" of all blocks that are signal sources (step 92). The process 32 determines if the set S is empty (step 94). If the set S is empty, the process 32 draws the frame and channel information on the GUI lines (step 96) and terminates (step 98). If it is determined that the set S is not empty (at step 94), the process 32 operates on a first source "B" in the set S (step 100). The process 32 determines if the frame/channel information is known for all output signals of B (step 102). If the frame/channel information is unknown for any output signal, the process 32 determines from the result that an error condition has occurred and terminates at step 98. If the information for all outputs signals of first source B is known, the process sends the frame/channel information to all blocks connected to the first source B (step 104). If any errors are detected as a result (step 106), the process 32 terminates at step 98. If no errors are detected (at step 106), the process 32 removes the first source B from the set S (step 108) and returns to step 94.

Referring now to FIG. 5A, the process of sending the frame and channel information to each of the destination blocks (which then process the frame information), that is, step or process 104 of FIG. 5A, begins (step 110) by creating a set S of all blocks which receive input signals from the given source block (step 112). The process 104 determines if the set S is empty (step 114). If it is determines that the set S is empty, the process 104 terminates (step 116). If the set S is determined to be a non-empty set, the process 104 operates on a first block B in the set S (step 118). The process 104 sends the frame/channel information for the given source block to the block B (step 120), causing the block B to use the information to determine frame/channel information for its output signals (step 121). If the process 104 detects any errors as a result of the propagation of the frame information and adaptation by the downstream block B (step 122), the process 104 terminates (at step 116). If no errors are detected, the process 104 sends the frame/channel information to all blocks which receive input signals from B (step 124) (recursive call to the step 124). Again, if any errors are detected at this stage in the processing (step 126), the process 104 terminates (with any errors indicated) at step 116. Otherwise, the process 104 removes the block B from the set S (step 128) and returns to step 114.

The manner in which the downstream blocks receive and adapt their behavior in response to the frame/channel information (at step 121, FIG. 5B) is described in further detail with reference to FIG. 5C. Referring now to FIG. 5C, the block adaptation process 121 begins (step 130) by determining if newly identified frame/channel information for the block B is consistent with the already known frame/channel information of the input and output signals of this block (step 132). If the adaptation process 121 detects any errors (step 134), the process 121 terminates with error(s) indicated (step 136). If no errors are detected, the process 121 uses the known frame/channel information of the input signal or signals to determine the unknown frame/channel information of the input and output signals (step 138). The adaptation process 121 determines if frame/channel information is known for all input signals of B (step 140). If yes, the process 121 determines if the frame/channel information is known for all output signals of B (step 142). If the determinations at steps 140, 142 indicate that the frame/channel information for any input or output signal of B remains unknown, the process 121 terminates (with errors indicated) at step 136. If the process 121 determines at step 142 that the frame/channel information is known for all output signals of B, the process 121 terminates (with no errors indicated) at step 136. Once frame/channel information is known for all input and output signals for block B, the appropriate output method is chosen for this block.

At the block adaptation stage of processing, and more specifically, at step 138, the block B uses rules to determine its output frame and channel information on the basis of its input frame and channel information. For example, a buffer block, which takes a sample-based signal and converts it to a frame-based signal of specified frame size, enforces a restriction that the input be a sample-based signal. The buffer block outputs a frame-based signal of a frame size specified for that block. In another example, an Upsampler block, which takes a sample- or frame-based signal and "upsamples" it by an integer factor, enforces the following restrictions: (1) if the input is sample-based, then the output is also sample-based; (2) if the input is frame-based, then the output is frame-based; (3) the input and output signals have the same channel size; and (4) the output frame size is the input frame size multiplied by the upsampling factor.

To prevent secondary users (who implement custom blocks) from having to implement these rules for each of their blocks, built-in default rules may be provided. For example, one default rule may provide that, for blocks with one input signal and one output signal, it is assumed that the input and output signals have identical frame and channel attributes. Another default rule could provide that, for blocks with multiple input signals and one output signal, the process 121 implement one of the following three cases: (i) if all inputs are sample-based, then the output is sample-based; (ii) if all inputs are frame-based, then the output is frame-based, and all inputs and the output are constrained to have the same sizes for the frame and channel attribute; and (iii) if some inputs are sample-based and some are frame-based, then the output is set to be frame-based, and all frame-based inputs and the output are constrained to have the same size for the frame and channel attribute.

For all other blocks that do not explicitly specify their rules for processing frame/channel information, the process 121 indicates an error.

The process 121 is applicable to use by both secondary and tertiary users. When secondary users implement custom blocks, they specify the information at steps 132 and 138 for those custom blocks. The tertiary users specify frame and channel information in the source, buffer-type and rate-conversion blocks of their block diagram. The propagation engine takes care of the other blocks, as described above.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of processing a block diagram model, comprising:
   receiving a diagram of blocks for a model;
   receiving frame attributes information for at least one block in the diagram of blocks for the model; and
   using the frame attributes information to produce unspecified frame attributes information for other blocks in the diagram of blocks for the model;
   wherein the frame attributes information is attributes information regarding frames, and a frame is a plurality of contiguous samples of input to one of the blocks in the diagram of blocks for the model.

2. The method of claim 1, wherein the frame attributes information comprises a frame size corresponding to a number of samples per frame (M).

3. The method of claim 1, wherein the frame attributes information further comprises a number of channels (N).

4. The method of claim 3, wherein the frame attributes information is represented as an array [M×N].

5. The method of claim 1, wherein the other blocks are downstream of the at least one block and wherein using comprises:
   enabling each of the other blocks to produce the unspecified frame attributes information.

6. The method of claim 1, wherein the at least one block comprises a source block.

7. The method of claim 6, wherein the at least one block further comprises a buffer-type block.

8. The method of claim 6, wherein the at least one block further comprises a sample rate conversion block.

9. The method of claim 6, wherein using comprises propagating the frame attributes information to ones of the other blocks connected to and receiving input signals from the source block.

10. The method of claim 9, wherein using further comprises:
    enabling each of the ones of the other blocks connected to and receiving input signals from the source block to produce the unspecified frame attributes information based on the propagated frame attributes information; and
    propagating the produced frame attributes information to other ones of the other blocks.

11. The method of claim 10, wherein propagating the frame attributes information and the produced frame attributes information serves to establish the blocks as either sample-based blocks or frame-based blocks, further comprising:
    providing visual cues to a user on a user interface used by the user to view the model to enable the user to distinguish the sample-based blocks from the frame-based blocks.

12. The method of claim 11, wherein a visual cues comprise a representation of the number of samples in a frame and a number of channels drawn on lines interconnecting the blocks.

13. The method of claim 11, wherein providing the visual cues comprises drawing single lines to represent input signals to the sample-based blocks and drawing double lines to represent input signals to the frame-based blocks.

14. The method of claim 5, wherein at least one of the other blocks includes sample-based and frame-based implementations of a primitive, and wherein the produced frame attributes information are used to select an appropriate one of the sample-based and frame-based implementations.

15. The method of claim 1, wherein each of the blocks has a corresponding set of rules for determining the unspecified frame attributes information given frame attributes propagated as a result of received frame attributes information.

16. The method of claim 15, wherein at least one of the blocks is a user-designed block, and wherein a user is provided with a set of default rules for use by the user-designed block in determining the unspecified frame attributes information given frame attributes information propagated as a result of specified frame attributes information.

17. A computer program product residing on a computer-readable medium for processing a block diagram model, the computer program product comprising instructions causing a computer to:
    receive a diagram of blocks for a model;
    receive frame attributes information for at least one block in the diagram model; and
    use the frame attributes information to produce unspecified frame attributes information for other blocks in the diagram model;
    wherein the frame attributes information is attributes information regarding frames, and a frame is a plurality of contiguous samples of input to one of the blocks in the diagram of blocks for the model.

18. A computer system comprising:
    means for receiving a diagram of blocks for a model developed by a user;

means for receiving frame attributes information for at least one block in the diagram of blocks for the model; and means for using the frame attributes information to produce unspecified frame attributes information for other blocks in the diagram of blocks for the model;

wherein the frame attributes information is attributes information regarding frames, and a frame is a plurality of contiguous samples of input to one of the blocks in the diagram of blocks for the model.

19. The method of claim 1 wherein the other blocks are upstream of the at least one block wherein using comprises enabling each of the other blocks to produce the unspecified frame attributes.

20. The method of claim 9 wherein using further comprises:

enabling each of the ones of the blocks connected to and receiving output signals from the source block to produce the unspecified frame attributes information based on the propagated frame attributes information; and propagating the produced frame attributes information to other ones of the other blocks connected to and receiving output signals.

* * * * *